Feb. 24, 1925.

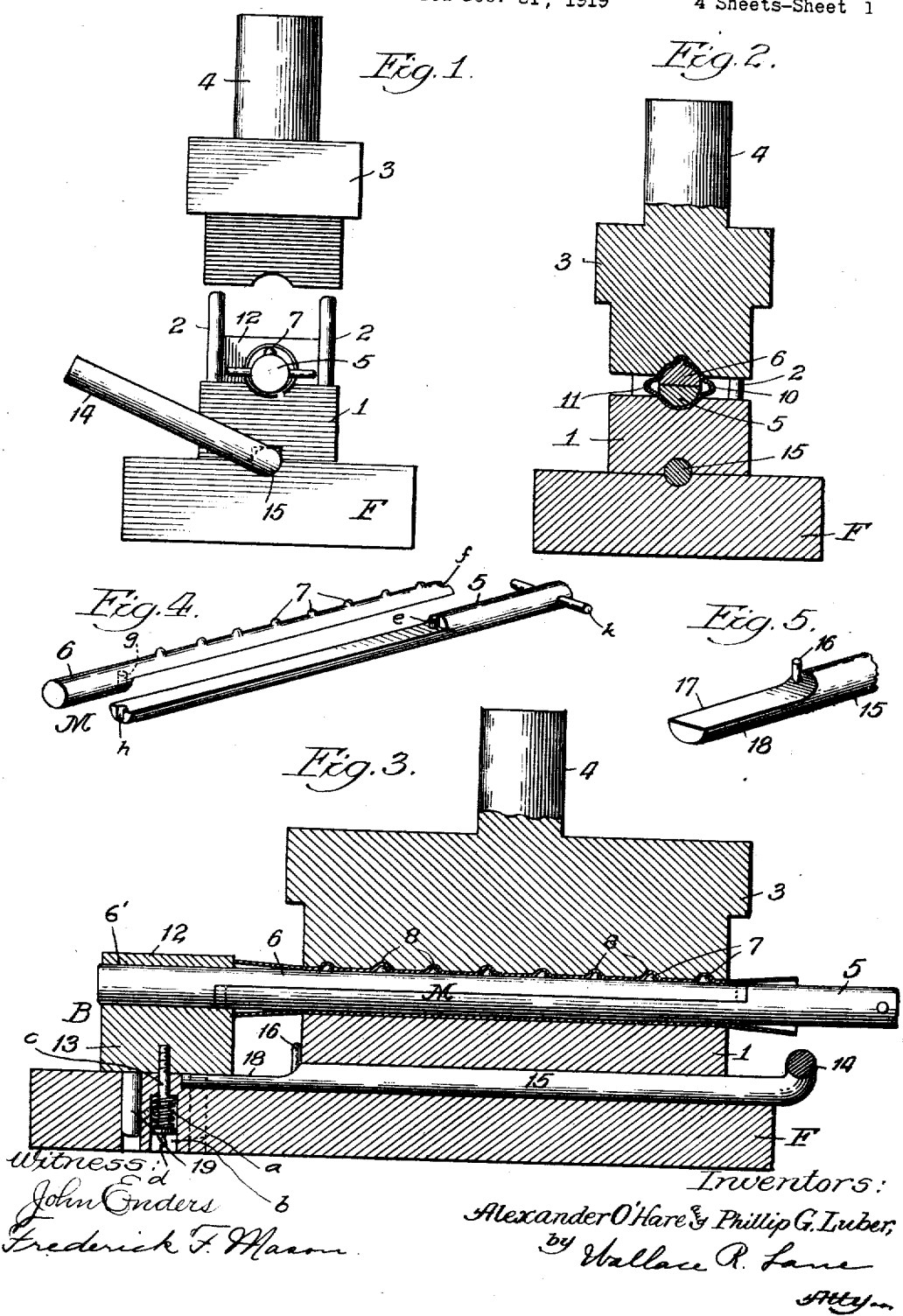

A. O'HARE ET AL 1,527,210

GAS BURNER

Filed Dec. 31, 1919

Witness:
John Enders
Frederick F. Mason

Inventors:
Alexander O'Hare & Phillip G. Luber,
by Wallace R. Lane
Atty

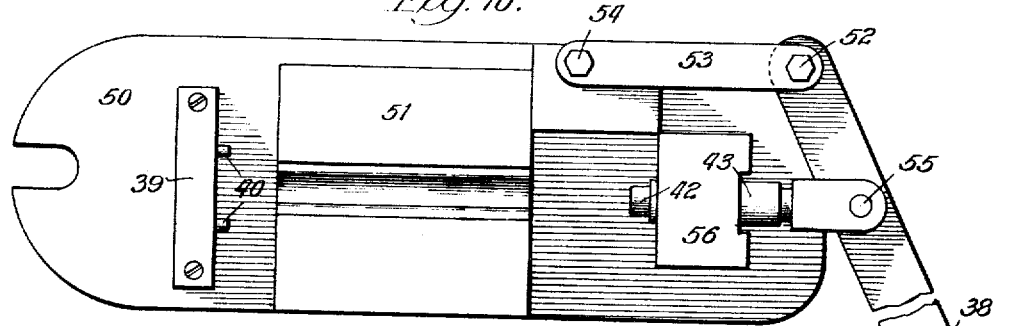
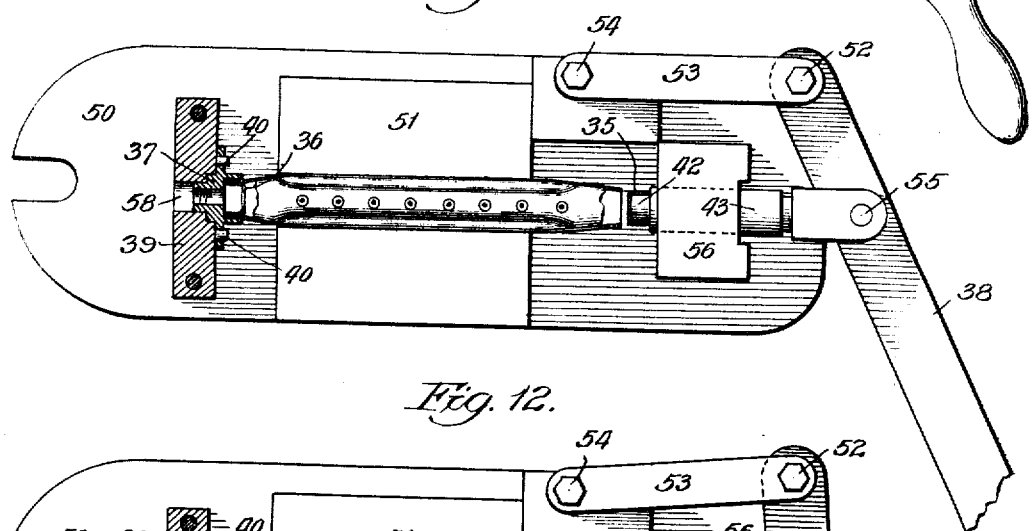
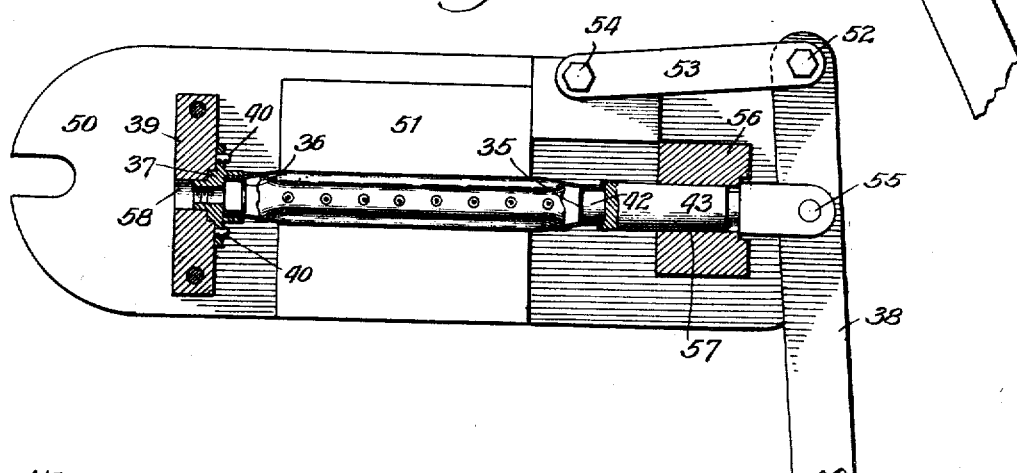

Feb. 24, 1925.
A. O'HARE ET AL
1,527,210
GAS BURNER
Filed Dec. 31, 1919
4 Sheets-Sheet 4
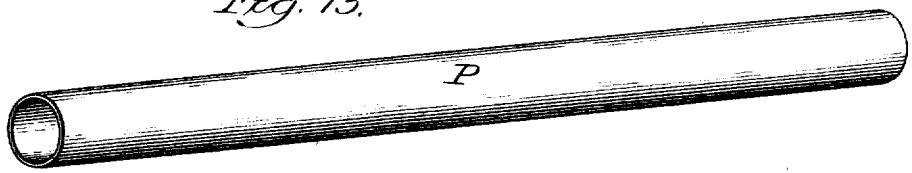
 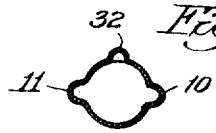
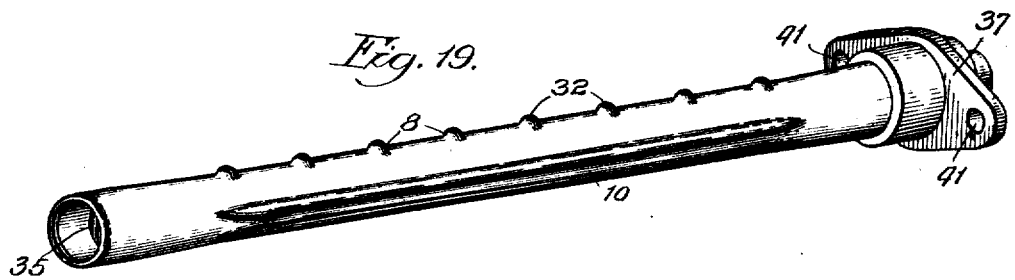

Patented Feb. 24, 1925.

1,527,210

UNITED STATES PATENT OFFICE.

ALEXANDER O'HARE AND PHILIP G. LUBER, OF CHICAGO, ILLINOIS, ASSIGNORS TO ILLINOIS SPECIALTY MANUFACTURING CO., OF BLOOMINGTON, ILLINOIS, A CORPORATION OF ILLINOIS.

GAS BURNER.

Application filed December 31, 1919. Serial No. 348,668.

*To all whom it may concern:*

Be it known that we, ALEXANDER O'HARE and PHILIP G. LUBER, both citizens of the United States, residing at Chicago, in the county of Cook and State of Illinois, have invented certain new and useful Improvements in Gas Burners, of which the following is a specification.

This invention relates to burners, especially adapted for burning gas and to the method and apparatus for constructing the same.

Among the objects of our invention are to provide an improved burner, possessing maximum efficiency, greater simplicity and capable of more rapid and economical production; to provide a burner especially adapted for use in gas heaters but capable of application in other connections if desired; to provide a novel and improved method of constructing such burners; to provide apparatus especially adapted for the rapid and economical production of said burners; to make a gas burner entirely of aluminum; to generally improve the construction of gas burners and the method and apparatus for producing the same; and such further objects, advantages and capabilities as will later more fully appear.

Our invention further resides in the combination, construction and arrangement of the burner and apparatus illustrated in the accompanying drawing for carrying out the method described hereinafter, and while we have illustrated a preferred embodiment of burner and apparatus, for reducing our method to practice, we desire the same to be understood as illustrative only, and not as limiting our invention.

In the drawings—

Fig. 1 is an end elevation showing in separated relation a pair of dies for carrying out the first step of our method.

Fig. 2 is a transverse vertical section through said dies, and showing them in closed relation.

Fig. 3 is a vertical longitudinal section through said dies.

Fig. 4 is a perspective view showing in separated relation the parts of the removable mandrel.

Fig. 5 is a fragmentary perspective view of the rear end of the shaft for releasing the mandrel after the dies have been brought together.

Figure 8:
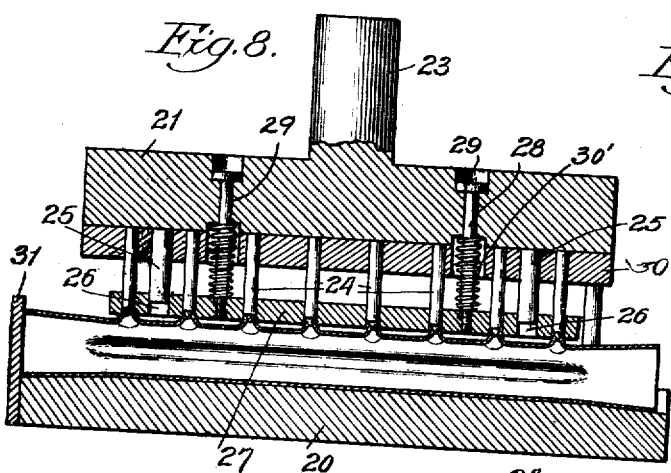
Fig. 8 is a vertical longitudinal section through Fig. 6.

Fig. 8ª is a fragmentary section through a portion of the burner tube, bar 27 and pointed pins 24.

Figure 6:
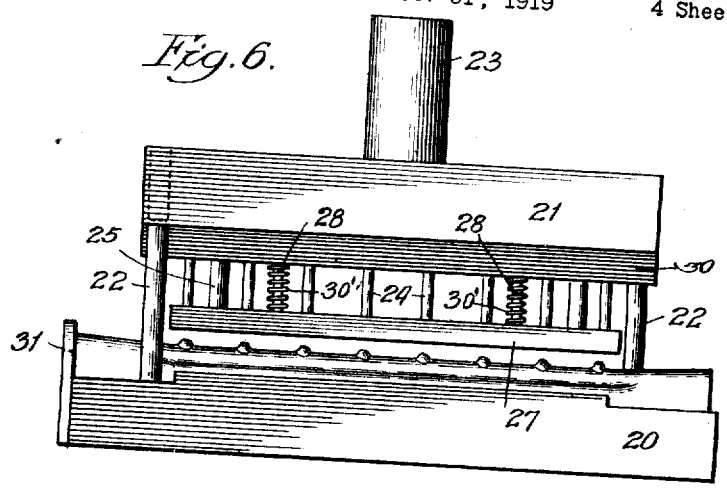
Fig. 6 is a side elevation of the apparatus for piercing holes in the burner.
Figure 9:
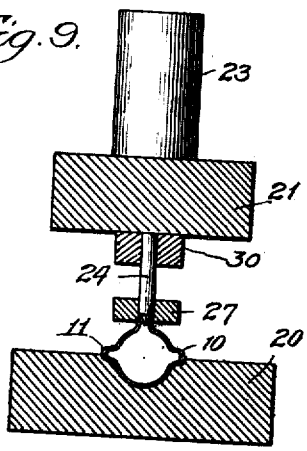

Fig. 9 is a vertical transverse section through Fig. 6; each of Figs. 8 and 9 showing the floating member depressed.

Fig. 10 is a plan view of the apparatus for carrying out the final step of our method.

Fig. 11 is a view similar to Fig. 10 but showing a burner in position therein, and ready for having the closures and connecting head pressed into final position.

Fig. 12 is a view similar to Fig. 11 but showing the parts pressed into final position.

Fig. 13 shows a section of a plain pipe from which our burner is constructed.

Fig. 14 is a view of the pipe of Fig. 13 after it has been pressed in the apparatus of Figs. 1, 2 and 3.

Fig. 15 is a view at right angle to Fig. 14 and showing a vertical longitudinal section of one end of the pipe.

Fig. 16 is a fragmentary vertical longitudinal section of the opposite end of the pipe.

Fig. 17 is a vertical transverse section through the pipe shown in Fig. 14.

Fig. 18 is a vertical longitudinal section through the completed burner.

Fig. 19 is a perspective view of our burner in completed form.

The burner of this invention is preferably made entirely of aluminum and our method of forming the same comprises three main steps as follows: First, inserting the blank tube into position between suitable dies and pressing the same to shape; second piercing holes in the pipe to permit the flow of gas therefrom; and third assembling the closures and connecting head into position in the partially completed burner and at a single operation pressing them home, to complete the burner.

The first step is carried out in the apparatus shown in Figs. 1 to 3; the second step in the apparatus shown in Figs. 6 to 9, and the third or final step of the invention is carried out in the apparatus shown in Figs. 10 to 12 inclusive. The changes in form of the pipe as it goes through the various steps will be understood from an inspection of Figs. 13 to 19. Fig. 13 shows the blank pipe, which after being pressed to shape in the apparatus of Fig. 1, will appear as shown in Figs. 14 and 15. The pipe after having holes pierced therein, in the apparatus of Figs. 6 to 9, will appear as shown in Fig. 16. The finishel burner is shown in section, in Fig. 18 and in perspective in Fig. 19.

As seen in Figs. 1 to 3, the apparatus for carrying out the first step comprises the lower die 1 having the upstanding pins 2 adapted to enter in suitable openings in the upper die 3 for bringing the dies into registry in the usual manner. The upper die 3 is provided with the upstanding head 4 adapted to receive a blow or other suitable pressure for operation of the dies. In Fig. 4 is shown a two part mandrel (for forming the interior of the burner, see Figs. 1–3) which is longitudinally divided into the two parts, 5 and 6, tapering slightly toward their smaller ends so that it may be readily disengaged from pipe P by first pulling outwardly on part 5 after the pipe has been pressed into the form shown in Fig. 14, and then removing the burner or pipe P (as explained later) from part 6 the circular end of which is preferably fixed in aperture 6′ of block B. Part 6 of the mandrel M is provided with the upstanding projections 7, to press out the metal of pipe P and form therein the upstanding projections 8 shown in Fig. 15. It is mainly because of the projections 7 that the mandrel M is constructed as shown in Fig. 4. The diameter of the mandrel M being smaller than that of pipe P the surplus metal of the pipe will be forced outwardly on each side to form the laterally extending hollow beads 10 and 11 shown in Fig. 2 the length of which will be approximately coextensive with that of the series of projections 7. These beads, 10 and 11 are important since they not only give added strength and stiffness but assist greatly in the proper distribution of gas to the outlet openings hereinafter described. As seen in Figs. 3, 15 and 16, the ends of the pipe P will be slightly flaring outwardly since they do not fall within the confines of the dies 1 and 3.

Removably mounted upon foundation block F and slightly to the rear of dies 1 and 3, is the block B comprising the integral upper and lower parts 12 and 13, and being provided with bore 6′ to receive the cylindrical end of part 6 of mandrel M. The block B is normally forced downward against foundation plate F by means of spring $a$, carried in opening $b$ by stud $c$ screwed into block B, said spring normally pressing downward on head $d$, but permitting a slight upward movement of block B under action of shaft 15 when rotated by handle 14 formed upon the outer end thereof. Shaft 15 carries near its inner end, the upstanding pin 16 to prevent its inadvertent withdrawal and is partially cut away from the pin to the end of the shaft as shown in Fig. 5. When the block B is in the position shown in Fig. 3, the flat part of end of shaft 15 will rest against the bottom of the block. When handle 14 is rotated one or the other of edges 17 and 18 will push upwardly on block B to raise the same against action of spring $a$. When block B is raised the burner pipe will clear the lower part 1 of the die, the part 5 of the mandrel having been previously removed as described above. Block B may be additionally held in position on foundation F by means of pins 19, which permit a vertical movement of the block in an obvious manner.

In order to provide perforations through the upstanding projections 8 the pipe is next placed in the apparatus of Fig. 6 which comprises the lower member or die 20 and the upper or floating die 21, which dies may be held in suitable registry by means of upstanding pins 22, fixed in one of these dies and slidably mounted in apertures in the other. The upper die 21 is provided with the upstanding head 23 for receiving a blow or other pressure to operate the dies. Secured to the lower face of die 21 is the bar 30, in which is fixed a plurality of downwardly projecting pins 24, pointed at their lower ends. Also secured in bar 30 are the downwardly projecting pins 25, which have longitudinal movement through apertures 26 in lower bar 27, which is carried at the lower end of rods 28 passing through openings 29 in upper die 21. Encircling rods 28 are the spiral springs 30′ which normally hold bar 27 beyond the pointed ends of pins 24. The lower die 20 is provided at one end with the abutment block 31, against which the end of the pipe or burner may be brought to proper position in the die to bring the upstanding projections 8 beneath the pointed ends of pins 24, so that when die 21 is forced downwardly the pointed ends of pins 24 will be driven through the metal of upstanding projections 8 to form the perforations 32 for the escape of gas to be ignited.

Figure 7:
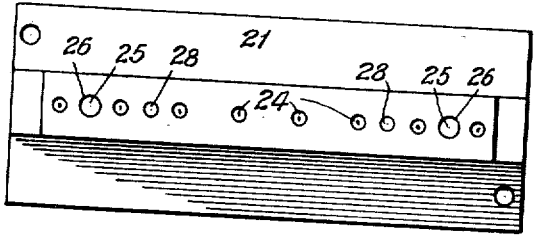
Fig. 7 is a plan view of the lower face of the floating member of Fig. 6.

The partially completed burner is then removed from the apparatus of Figs. 6 to 8 and placed within the apparatus shown in Figs. 10 to 12; but prior to placing in the latter mentioned apparatus the imperforated cup shape cap 35, will be placed in one end of the pipe and the perforate cap or cup 36 in the other end. Over the end of the pipe carrying perforate cap 36 will be placed the connecting head 37, it being understood that all of these three last mentioned parts will be simply inserted loosely by hand. The pipe with the parts just referred to, loosely in position will be placed in the apparatus of Figs. 10 to 12 and lever arm 38 will be moved to the left to press these parts tightly into finished position. To properly position the connecting head 37 the block 39 is provided with the outstanding pins 40, over which the apertures 41 in the connecting head will loosely fit. The closure 35 may either be inserted in the end of the pipe or loosely fitted over the end 42 of the pressure rod 43, which when moved into final position will press closure 35 into the pipe or burner as shown in Figure 12, it being understood that simultaneously with this movement pressure rod 43 also presses into position the perforate cap 36 and connecting head 37, thus completing the burner.

Attention is called to the fact that as shown in Fig. 12 the offset between the pressure rod 43 and the head 42 is curved inwardly, whereby the end of the burner will be pressed or crimped downwardly over the outer edge of the closure 35, as shown more clearly in the left hand portion of Fig. 18, to more securely hold the same in position.

As shown in Figs. 10 to 12 the apparatus for carrying into effect the last step of our method, comprises the foundation plate 50, upon which is mounted the block 51, having therein a suitable groove to receive the burner with the three end members inserted in position as referred to above. The lever 38 is pivoted at 52 to link 53, which is in turn pivoted to plates 50 to 54. Lever 38 is also pivoted to rod 43 at 55 and as will be readily understood any movement of the end of lever 38 other than in a straight line will be accommodated for by link 53. Pressure rod 43 is mounted for suitable movement in block 56; the opening 57 therein being in alinement with opening 58 in the block 39 referred to above, to bring the various parts in proper alinement. In use the burner will be inserted through a suitable opening in the casing of the heater or other device in which it is to be used and a connecting head suitably secured thereto by bolts or the like, passing through holes 41, after which the gas line will be connected with the connecting head by any suitable connection, which may screw into the threads of the connecting head, shown in Fig. 18. It is of course, to be understood that any other suitable manner of connecting with the gas line may be employed, such for example as slipping the end of a rubber tube over the end of connection 37 if desired.

Referring back to mandrel M it will be noted in Fig. 4 that part 5 carries a short upstanding pin 2 adapted to fit into notch *f* of part 6; while part 6 carries the projecting pin *g* adapted to fit into the notch *h*, so as to bring the parts of the mandrel into proper position for use. Part 5 is provided with a small handle *k* to facilitate its removal.

The radius of pipe P of Fig. 13 is slightly greater than the radius of the curved depression in die 1 which forms the seat for the pipe, so as to facilitate the formation of beads 10 and 11.

While aluminum is preferred as a material for our burner it is to be understood that other metals may be used if desired. Aluminum however avoids corrosion from the collection of moisture on the tips, and permits the tubing for pipes P to be "drawn" in great lengths.

Having now described our invention, we claim:

1. A gas burner comprising an elongated partially flattened pipe having a plurality of outlet openings, one end of said pipe being closed by an inverted cap being tightly fitted therein, a perforated inverted cap fitted in the other end, and a connection head fitted over said last mentioned end.

2. A gas burner comprising an elongated partially flattened pipe having a plurality of outlet openings, one end of said pipe being closed by an inverted cap being tightly fitted therein, a perforated inverted cap fitted in the other end, and a connection head fitted over said last mentioned end, said connection head having an opening therein in alinement with the opening in said perforated cap.

3. A gas burner comprising an elongated aluminum pipe having an outstanding hollow bead along each side, upstanding spaced hollow perforated projections along its upper side, an inverted cap tightly fitted into one end of said pipe, the marginal end of said connection head having an opening than that of the exterior of said cap to prevent removal of the same, a perforated inverted cap tightly secured in the other end of said pipe, a connection head tightly fitting over the last mentioned end of said pipe, said head having an opening in alinement with the perforation in said last mentioned cap, outstanding flanges on said head, means on said flanges for securing and holding said burner in operative position, and means on said head for securing thereto a gas line.

4. A gas burner comprising an elongated pipe having laterally extending hollow beads, a series of perforations in one face of said pipe, said series of perforations and said hollow beads being approximately coextensive in length.

5. A gas burner comprising a pipe having outlet openings and laterally extending hollow beads along its sides.

In witness whereof, we hereunto subscribe our names to this specification in the presence of two witnesses.

ALEXANDER O'HARE.
PHILIP G. LUBER.

Witnesses:
A. E. KLUNDER,
FREDERICK F. MASON.

of said pipe, said series of perforations and said hollow beads being approximately coextensive in length.

5. A gas burner comprising a pipe having outlet openings and laterally extending hollow beads along its sides.

In witness whereof, we hereunto subscribe our names to this specification in the presence of two witnesses.

ALEXANDER O'HARE.
PHILIP G. LUBER.

Witnesses:
A. E. KLUNDER,
FREDERICK F. MASON.

Certificate of Correction.

It is hereby certified that in Letters Patent No. 1,527,210, granted February 24, 1925, upon the application of Alexander O'Hare and Philip G. Luber, of Chicago, Illinois, for an improvement in "Gas Burners," an error appears in the printed specification requiring correction as follows: Page 3, line 115, claim 3, strike out the words "connection head having an opening" and insert instead *pipe being reduced in diameter to less;* and that the said Letters Patent should be read with this correction therein that the same may conform to the record of the case in the Patent Office.

Signed and sealed this 14th day of April, A. D. 1925.

[SEAL.]

KARL FENNING,
*Acting Commissioner of Patents.*

Certificate of Correction.

It is hereby certified that in Letters Patent No. 1,527,210, granted February 24, 1925, upon the application of Alexander O'Hare and Philip G. Luber, of Chicago, Illinois, for an improvement in "Gas Burners," an error appears in the printed specification requiring correction as follows: Page 3, line 115, claim 3, strike out the words "connection head having an opening" and insert instead *pipe being reduced in diameter to less;* and that the said Letters Patent should be read with this correction therein that the same may conform to the record of the case in the Patent Office.

Signed and sealed this 14th day of April, A. D. 1925.

[SEAL.]

KARL FENNING,
*Acting Commissioner of Patents.*